United States Patent [19]
Koyano et al.

[11] Patent Number: 5,972,082
[45] Date of Patent: Oct. 26, 1999

[54] AQUEOUS INK COMPOSITION AND INK-JET PRINTING METHOD USING THE SAME

[75] Inventors: Masayuki Koyano, Sagamihara; Ikuko Yamada, Kawasaki; Akio Kojima, Mitaka; Kiyofumi Nagai, Machida; Masato Igarashi; Akiko Konishi, both of Yokohama; Hiroyuki Mochizuki, Chofu; Takanori Tsuyuki, Yokohama, all of Japan

[73] Assignee: Ricoh Company, Ltd., Tokyo, Japan

[21] Appl. No.: 08/848,192

[22] Filed: Apr. 29, 1997

[30] Foreign Application Priority Data

Apr. 30, 1996 [JP] Japan .................................... 8-132733
Jun. 25, 1996 [JP] Japan .................................... 8-184053
Oct. 31, 1996 [JP] Japan .................................... 8-305749

[51] Int. Cl.$^6$ .................................................... C09D 11/00
[52] U.S. Cl. .................. 106/31.27; 106/31.6; 106/31.86; 106/31.58; 106/31.43; 106/31.75
[58] Field of Search ............................. 106/31.27, 31.58, 106/31.43, 31.75, 31.6, 31.86

[56] References Cited

U.S. PATENT DOCUMENTS

| | | |
|---|---|---|
| 4,647,310 | 3/1987 | Shimada et al. . |
| 4,711,668 | 12/1987 | Shimada et al. . |
| 4,793,860 | 12/1988 | Murakami et al. . |
| 5,389,131 | 2/1995 | Colt et al. ............................. 106/31.27 |
| 5,431,720 | 7/1995 | Nagai et al. . |
| 5,514,208 | 5/1996 | Nagai et al. . |
| 5,554,213 | 9/1996 | Radigan, Jr. et al. ............... 106/31.58 |
| 5,696,182 | 12/1997 | Kashiwazaki et al. .............. 106/31.27 |
| 5,769,930 | 6/1998 | Sano et al. ........................... 106/31.58 |

*Primary Examiner*—Mark L. Bell
*Assistant Examiner*—Veronica F. Faison
*Attorney, Agent, or Firm*—Oblon, Spivak, McClelland, Maier & Neustadt, P.C.

[57] ABSTRACT

An aqueous ink composition contains a colorant and a humectant, and has a surface tension γ of less than 50 mN/m when measured by a maximum bubble pressure method at 25° C., with a bubble frequency ν of the aqueous ink composition being set at less than 1 Hz, and a surface tension γ of more than 40 mN/m when measured by the maximum bubble pressure method at 25° C., with the bubble frequency ν of the aqueous ink composition being set at more than 5 Hz. In addition, an ink-jet printing method for forming ink images on an image-receiving medium has the step of ejecting the above-mentioned aqueous ink composition in the form of droplets according to the recording signals at a recording frequency of 8 kHz or more.

5 Claims, 1 Drawing Sheet

FIG. 1

AQUEOUS INK COMPOSITION AND INK-JET PRINTING METHOD USING THE SAME

BACKGROUND OF THE INVENTION

1. Field of the Invention

The present invention relates to an aqueous ink composition, more particularly to an aqueous ink composition which comprises as the main components a colorant and a humectant.

The present invention also relates to a method of ink-jet printing method using the above-mentioned aqueous ink composition.

2. Discussion of Background

Ink-jet printers have been widely utilized in recent years because of the advantages of low noise and low running cost, and color printers capable of producing color images on a sheet of plain paper have also been placed on the market.

However, it is extremely difficult to obtain a color ink composition which is satisfactory with respect to the requirements such as the following: image density, color reproduction, water-resistance, light-resistance, drying characteristics, blurring of images and the strike-through phenomenon, and the reliability of ink-ejection. In particular, it is necessary to control not only the wettability of plain paper by the ink composition and the penetration properties of the ink into the paper, but also the wettability of a material constituting the flow path for ink composition in the ink-jet printer (hereinafter referred to as the ink flow path) by the ink composition and the penetration properties of the ink into the above-mentioned material for path. Therefore, the formulation for the aqueous ink is of great importance because the above-mentioned physical properties are determined by the ink composition.

The addition of an alkyl alcohol having 1 to 4 carbon atoms, and a monohydric alcohol having 4 carbon atoms or less, to the formulation for the ink composition is proposed as disclosed in Japanese Laid-Open Patent Applications 6-100808 and 6-166841, respectively. Such alcohols are added to the ink composition not only to improve the image quality, but also to ensure proper wettability of the material constituting the ink flow path by the ink composition. When such proper wettability of the ink flow path by the ink composition is obtained, the ink can be readily loaded into an ink container at the initial stage (this performance will be hereinafter referred to as initial ink-loading performance), and the bubble generated in the ink container can be easily sent out therefrom (this performance will be hereinafter referred to as bubble-discharging performance). Further, the ink-refilling performance for the nozzle can be improved. However, those alcohols have odor and have the problems of safety and stability during the long-term storage.

In Japanese Laid-Open Patent Application 6-136306, an aqueous ink composition comprising a styrene-acrylic acid copolymer is disclosed. However, when the ink-jet printer with a stationary-type head is supplied with the above-mentioned ink composition, the reliability of ink-ejecting performance is unsatisfactory.

The inventors of the present invention have already proposed aqueous ink compositions, each of which comprises a specific surfactant so as to improve the drying characteristics of the obtained images and minimize the deterioration of image quality, as disclosed in Japanese Laid-Open Patent Applications 6-107990 and 6-322303. However, even though those ink compositions are employed for ink-jet printing, all of the previously mentioned requirements are not satisfied. At present there is an increasing demand for further improvement of the image density and reduction of image blurring.

SUMMARY OF THE INVENTION

Accordingly, it is therefore a first object of the present invention to provide an aqueous ink composition which can satisfy all the requirements of the ink composition for ink-jet printing, in particular, which can produce high quality ink images on plain paper with improved reliability of ink ejection.

A second object of the present invention is to provide an ink-jet printing method using the above-mentioned aqueous ink composition.

The first object of the present invention can be achieved by an aqueous ink composition comprising a colorant and a humectant. This ink composition has a surface tension $\gamma$ of less than 50 mN/m when measured by a maximum bubble pressure method at 25° C., with a bubble frequency $\nu$ of the aqueous ink composition being set at less than 1 Hz, and a surface tension $\gamma$ of more than 40 mN/m when measured by the maximum bubble pressure method at 25° C., with the bubble frequency $\nu$ of the aqueous ink composition being set at more than 5 Hz. Therefore, this ink composition is suitable for ink-jet printing, in particular, capable of producing high quality ink images with high image density on a sheet of plain paper, without feathering or a so-called "strike through" phenomenon, with excellent reliability of ink-ejecting performance.

The second object of the present invention can be achieved by an ink-jet printing method for forming ink images on an image-receiving medium, comprising the step of ejecting the above-mentioned aqueous ink composition in the form of droplets according to recording signals at a recording frequency of 8 kHz or more.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

An aqueous ink composition according to the present invention comprises a colorant capable of being dispersed or dissolved in water, and a humectant, and shows a surface tension ($\gamma$) of less than 50 mN/m at a bubble frequency ($\nu$) of less than 1 Hz, and a surface tension ($\gamma$) of more than 40 mN/m at a bubble frequency ($\nu$) of more than 5 Hz when measured by a maximum bubble pressure method at 25° C.

In the maximum bubble pressure method, when gas is fed to a capillary tip which is perpendicularly immersed in a liquid to a known depth, bubbles are generated. The surface tension $\gamma$ can be obtained from the measurement of the maximum pressure required to release the bubble. This method for measuring the surface tension is mentioned in "Colloids and Surfaces", vol. 44 (1990), pages 101–117.

According to the present invention, it is preferable that the bubble frequency $\nu$ of the ink composition and the surface tension γ measured by the maximum bubble pressure method at 25° C. be in the relationship of:

γ<46 mN/m when ν<1 Hz,
2.5 ν+30.5≦γ≦2.5 ν+43.5 when 1≦ν≦5 Hz, and
γ>43 mN/m when ν>5 Hz.

In the present invention, the surface tension (γ) of the aqueous ink composition is generally more than 20 mN/m when ν<1 Hz, and less than 70 mN/m when ν>5 Hz.

The surface tension γ of the ink composition at a bubble frequency ν of less than 1 Hz indicates a relatively static surface tension which is measured in a saturated time. In the present invention, since the surface tension γ is less than 50 mN/m at a bubble frequency ν of less than 1 Hz, the wettability of the ink flow path by the ink composition is sufficient and the ink ejecting performance is sufficiently reliable. If the surface tension γ is 50 mN/m or more, the initial ink-loading performance and the bubble-discharging performance are considerably worsened.

The surface tension γ of the ink composition at a bubble frequency ν of more than 5 Hz indicates a dynamic surface tension which is measured in a short period of time. In the present invention, since the surface tension γ is more than 40 mN/m at a bubble frequency ν of more than 5 Hz, the ink composition of the present invention can produce images with high reflection density on plain paper without feathering. To be more specific, if the surface tension γ is 40 mN/m or less at a bubble frequency ν of more than 5 Hz, the ink cannot uniformly spread on the surface of paper after the ink droplets are ejected on a sheet of plain paper. The ink images thus obtained are free from edge sharpness. Further, in this case, the ink tends to penetrate into plain paper in the depth direction thereof, so that sufficient reflection density cannot be obtained.

Further, both of the reliability of ink-ejecting performance and the image quality of ink images formed on paper are influenced under such condition of 1≦ν≦5 Hz. When the surface tension γ is controlled within the above-mentioned range under such condition of 1≦ν≦5 Hz, the aqueous ink composition of the present invention can be provided with all the requirements for ink-jet printing.

The aqueous ink composition according to the present invention may further comprise at least the following surfactants A and B:

(i) a surfactant A, with a 0.1 wt. % aqueous solution of the surfactant A having a surface tension γA (mN/m) of less than 50 mN/m at a bubble frequency νA (Hz) of less than 1 Hz when measured by the maximum bubble pressure method at 25° C., and (ii) a surfactant B, with a 0.1 wt. % aqueous solution of the surfactant B having a surface tension γB (mN/m) of more than 40 mN/m at a bubble frequency νB (Hz) of less than 1 Hz when measured by the maximum bubble pressure method at 25° C.

By the addition of the above-mentioned surfactant A, proper wettability of a material constituting the ink flow path by the obtained ink composition can be ensured when the ink composition is loaded into an ink-jet printer. When the surfactant B is added to the aqueous ink composition of the present invention, ink droplets can be ejected in a round form from the nozzle and uniformly spread on the surface of plain paper so as to form sharp picture elements. Thus, the image quality can be upgraded without impairing the initial ink-loading performance and bubble-discharging performance by using appropriate surfactants A and B in combination.

It is preferable that the above-mentioned surfactant A be selected from the group consisting of a polyoxyethylene alkyl ether acetate of formula (I):

$$R^1-O-(CH_2CH_2O)_m-CH_2COOM \qquad (I)$$

wherein $R^1$ is an alkyl group having 6 to 14 carbon atoms, which may be branched, m is an integer of 3 to 12, and M is a cation selected from the group consisting of alkali metal ion, quaternary ammonium cation, quaternary phosphonium cation and alkanol amine cation; and a dialkyl sulfosuccinate of formula (II):

$$\begin{array}{c} CH_2COO-R^2 \\ | \\ MO_3S-CHCOO-R^2 \end{array} \qquad (II)$$

wherein $R^2$ is an alkyl group having 5 to 7 carbon atoms, which may be branched, and M is a cation selected from the group consisting of alkali metal ion, quaternary ammonium cation, quaternary phosphonium cation and alkanol amine cation.

When such a specific surfactant A is employed, the reliability of ink-ejection can be further increased.

Specific examples of the polyoxyethylene alkyl ether acetate of formula (I) are as follows:

$$CH_3(CH_2)_{12}O(CH_2CH_2O)_3CH_2COOH \qquad (I-1)$$

$$CH_3(CH_2)_{12}O(CH_2CH_2O)_4CH_2COOH \qquad (I-2)$$

$$CH_3(CH_2)_{12}O(CH_2CH_2O)_5CH_2COOH \qquad (I-3)$$

$$CH_3(CH_2)_{12}O(CH_2CH_2O)_6CH_2COOH \qquad (I-4)$$

$$\begin{array}{c} CH_3(CH_2)_{11}CHO(CH_2CH_2O)_6CH_2COOH \\ | \\ CHO \end{array} \qquad (I-5)$$

$$\begin{array}{c} CH_3(CH_2)_6 \\ \phantom{CH_3(CH_2)_6}\diagdown \\ \phantom{CH_3(CH_2)_6}\phantom{x}CHO(CH_2CH_2O)_3CH_2COOH \\ \phantom{CH_3(CH_2)_6}\diagup \\ CH_3(CH_2)_5 \end{array} \qquad (I-6)$$

Specific examples of the dialkyl sulfosuccinate of formula (II) are as follows:

$$\begin{array}{c} \phantom{xxxxxxxx} CH_3 \phantom{xx} CH_3 \\ \phantom{xxxxxxxx} | \phantom{xxxxx} | \\ \phantom{xxx} CH_2COOCHCH_2CHCH_3 \\ | \\ HO_3S-CHCOOCHCH_2CHCH_3 \\ \phantom{xxxxxxxx} | \phantom{xxxxx} | \\ \phantom{xxxxxxxx} CH_3 \phantom{xx} CH_3 \end{array} \qquad (II-1)$$

$$\begin{array}{c} \phantom{xxxxxxxx} CH_3 \\ \phantom{xxxxxxxx} | \\ \phantom{xxx} CH_2COOCH(CH_2)_3CH_3 \\ | \\ HO_3S-CHCOOCH(CH_2)_3CH_3 \\ \phantom{xxxxxxxx} | \\ \phantom{xxxxxxxx} CH_3 \end{array} \qquad (II-2)$$

Further, it is preferable that the above-mentioned surfactant B be a nonionic surfactant. In particular, nonionic surfactants having an ethylene oxide chain in the molecular structure thereof, for example, polyoxyethylene alkyl ether and polyoxyethylene alkylphenyl ether are preferably employed.

When such a specific surfactant B is chosen for the ink composition, the wettability of plain paper by the ink and the penetrating properties of ink into plain paper are further improved.

As the humectant for use in the ink composition, a nitrogen-containing heterocyclic compound and/or a polyhydric alcohol may be employed. To be more specific, it is preferable that the humectant comprise at least one compound selected from the group consisting of 2-pyrrolidone, diethylene glycol and glycerin. In the case where those are used in combination, the ratio by weight of diethylene glycol to glycerin may be in the range of 1/1 to 5/1, and the weight ratio by weight of 2-pyrrolidone to the mixture of diethylene glycol and glycerin be in the range of 0/1 to 1/0.

Since such a specific humectant has excellent solubility stability, the fibers of paper can be uniformly dyed.

It is preferable that the colorant for use in the aqueous ink composition according to the present invention comprise at least one compound selected from the group consisting of the compounds formulae (III), (IV) and (V).

wherein W is —OH group and X is —$NH_2$ group, or W is —$NH_2$ group and X is —OH group, and $Q^1$ is a hydrogen atom or —$SO_3M$ group, in which M is a cation selected from the group consisting of alkali metal ion, quaternary ammonium cation, quaternary phosphonium cation and alkanol amine cation;

wherein $Q^2$ is a hydrogen atom or —COOM group, $Q^3$ is a hydrogen atom, —COOM group or —$SO_3M$ group, and $Q^4$ is a hydrogen atom, —$CH_2COOM$ group or —$CH_2CH_2COOM$ group,
in which M is a cation selected from the group consisting of alkali metal ion, quaternary ammonium cation, quaternary phosphonium cation and alkanol amine cation; and (V)

wherein W is —OH group and X is —NH$_2$ group, or W is —NH$_2$ group and X is —OH group, Y and Z are each independently —OH group or —NR$^3$R$^4$ group, Q$^5$ is a hydrogen atom, an alkyl group having 1 to 4 carbon atoms, an alkoxyl group having 1 to 4 carbon atoms, —COOM group, —SO$_3$M group or —NR$^3$R$^4$ group, and Q$^6$ is a hydrogen atom, an alkyl group having 1 to 4 carbon atoms, an alkoxyl group having 1 to 4 carbon atoms, —COOM group or —SO$_3$M group, in which M is a cation selected from the group consisting of alkali metal ion, quaternary ammonium cation, quaternary phosphonium cation and alkanol amine cation;

and R$^3$ and R$^4$ are each independently a hydrogen atom or an alkyl group having 1 to 18 carbon atoms, or R$^3$ and R$^4$ may form a substituted or unsubstituted five-membered or six-membered ring in combination with the nitrogen atom.

When the colorant comprises the above-mentioned specific compounds, the solubility stability is excellent, so that the image with high image density and improved color tone can be obtained.

Specific examples of the compound of formula (III) in the form of a free acid are as follows:

Specific examples of the compound of formula (IV) in the form of a free acid are as follows:

(IV-3)

Specific examples of the compound of formula (V) in the form of a free acid are as follows:

It is preferable that the aqueous ink composition of the present invention comprise the surfactant A in an amount of 0.05 to 1.0 wt. %, the surfactant B in an amount of 0.05 to 5.0 wt. %, the humectant in an amount of 1 to 20 wt. %, and the colorant in an amount of 1 to 10 wt. %, of the total weight of the aqueous ink composition. Thus, excellent properties for ink-jet printing can be imparted to the ink composition.

When the aqueous ink composition of the present invention is used for ink-jet printing method in such a manner that a nozzle of the ink-jet printer is caused to eject the ink composition onto plain paper in accordance with the recording signals, in a preferred embodiment the formulation for the aqueous ink composition may be adjusted so as to have a contact angle of 40° or more with respect to plain paper and a contact angle of 50° or less with respect to a material constituting the ink flow path of the ink-jet printer, when measured at 25° C.

Conventionally, when the contact angle of an ink composition with plain paper is controlled to 40° or more, there can be formed on plain paper high quality ink image with minimum feathering and high reflection density. However, the ink flow path in the ink-jet printer cannot be readily wetted with the above-mentioned ink composition. As a result, this has an adverse effect on the initial ink-loading performance and the bubble-discharging performance of the ink composition, and the reliability of ink ejection will be lowered.

According to the present invention, however, the formulation for the aqueous ink composition can be controlled so that the contact angle of the aqueous ink composition with the material constituting the ink flow path may be 50° or less without the addition of some alcohols to the formulation. Thus, the ink flow path can be properly wetted with the aqueous ink composition, with the result that the formation of high quality images can be achieved without lowering the reliability of ink-ejecting performance.

According to the present invention, there can be provided an ink-jet printing method for forming ink images on an image-receiving medium using the above-mentioned aqueous ink composition. Such an ink-jet printing method comprises the step of ejecting an aqueous ink composition in the form of droplets according to recording signals at a recording frequency of 8 kHz or more.

Namely, the aqueous ink composition of the present invention can cope with high recording frequency, so that high speed printing can be achieved.

In the above-mentioned ink-jet printing method it is preferable that the aqueous ink composition be deposited on the image-receiving medium with a deposition amount of 2.5 to 25 g/m² when the image-receiving medium is a sheet of plain paper. Thus, excellent image quality can be obtained.

The aqueous ink composition of the present invention comprises water as a liquid medium. To impart the desired physical properties to the obtained aqueous ink composition, to prevent the ink composition from drying, and to improve the solubility stability of the compounds employed in the ink composition, not only the above-mentioned humectants, but also the following organic solvents can be employed alone or in combination: polyhydric alcohols such as ethylene glycol, diethylene glycol, triethylene glycol, polyethylene glycol, polypropylene glycol, 1,5-pentanediol, 1,6-hexanediol, 1,2,6-hexanetriol, 1,2,4-butanetriol, 1,2,3-butanetriol, and 3-methylpentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 1,3-dimethylimidazolidinone, and ε-caprolactam; amides such as formamide, N-methylformamide, and N,N-dimethylformamide; amines such as monoethanol amine, diethanol amine, triethanol amine, monoethylamine, diethyl amine, and triethyl amine; sulfur-containing compounds such as dimethyl sulfoxide, sulfolane, and thiodiethanol; propylene carbonate; ethylene carbonate; and γ-butyrolactone.

The aqueous ink composition may further comprise a penetrating agent including the above-mentioned surfactants A and B.

Specific examples of the penetrating agent are anionic surfactants such as polyoxyethylene alkyl ether acetate, and dialkylsulfosuccinate having an alkyl chain with 5 to 7 carbon atoms, which may be branched; nonionic surfactants such as acetylene glycol, polyoxyethylene nonylphenyl ether, and polyoxyethylene alkyl ether; alkyl ethers or aryl ethers derived from polyhydric alcohols such as diethylene glycol monophenyl ether, ethylene glycol monophenyl ether, ethylene glycol monoaryl ether, diethylene glycol monophenyl ether, diethylene glycol monobutyl ether, propylene glycol monobutyl ether, and tetraethylene glycol chlorophenyl ether; fluorochemical surfactants; silicone-based surfactants; and lower alcohols such as ethanol and 2-propanol.

With respect to the colorant, the above-mentioned compounds (III) to (V) may be used in combination with other colorants such as water-soluble dyes and pigments when necessary. The water-soluble dyes for use in the present invention, which are divided into the following groups in accordance with the color index number, an acid dye, a direct dye, a basic dye, a reactive dye and a food dye, have water-resistance and light-resistance. Those dyes may be contained in the aqueous ink composition so long as the objects of the present invention are not impaired.

Specific examples of the acid dye and the food dye are as follows:
C.I. Acid Yellow 17, 23, 42, 44, 79, 142;
C.I. Acid Red 1, 8, 13, 14, 18, 26, 27, 35, 37, 42, 52, 82, 87, 89, 92, 97, 106, 111, 114, 115, 134, 186, 249, 254, 289;
C.I. Acid Blue 9, 29, 45, 92, 249;
C.I. Acid Black 1, 2, 7, 24, 26, 94;
C.I. Food Yellow 3, 4;
C.I. Food Red 7, 9, 14; and
C.I. Food Black 1, 2.

Specific examples of the direct dye are as follows:
C.I. Direct Yellow 1, 12, 24, 26, 33, 44, 50, 86, 120, 132, 142, 144;
C.I. Direct Red 1, 4, 9, 13, 17, 20, 28, 31, 39, 80, 81, 83, 89, 225, 227;
C.I. Direct Orange 26, 29, 62, 102;
C.I. Direct Blue 1, 2, 6, 15, 22, 25, 71, 76, 79, 86, 87, 90, 98, 163, 165, 199, 202; and
C.I. Direct Black 19, 22, 32, 38, 51, 56, 71, 74, 75, 77, 154, 168, 171.

Specific examples of the basic dye are as follows:
C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;
C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;
C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and
C.I. Basic Black 2, 8.

Specific examples of the reactive dye are as follows:
C.I. Reactive Black 3, 4, 7, 11, 12, 17;
C.I. Reactive Yellow 1, 5, 11, 13, 14, 20, 21, 22, 25, 40, 47, 51, 55, 65, 67;
C.I. Reactive Red 1, 14, 17, 25, 26, 32, 37, 44, 46, 55, 60, 66, 74, 79, 96, 97; and
C.I. Reactive Blue 1, 2, 7, 14, 15, 23, 32, 35, 38, 41, 63, 80, 95.

Examples of the pigment serving as the colorant in the aqueous ink composition of the present invention include organic pigments such as azo pigments, phthalocyanine pigments, anthraquinone pigments, quinacridone pigments, dioxazine pigments, indigo pigments, thioindigo pigments, perylene pigments isoindolenone pigments, Aniline Black, azomethine pigments, Rhodamine B lake pigments, and carbon black; and inorganic pigments such as iron oxide, titanium oxide, calcium carbonate, barium sulfate, aluminum hydroxide, barium yellow, prussian blue, cadmium red, chrome yellow, and metal powder.

In addition, the aqueous ink composition may further comprise a pigment dispersant.

Examples of the pigment dispersant for use in the present invention are natural hydrophobic polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, and collagen; microbial polymers such as xanthene, and dextran; semisynthetic hydrophobic polymers, for example, cellulose polymers such as methyl cellulose, ethyl cellulose, hydroxyethyl cellulose, hydroxypropyl cellulose, and carboxymethyl cellulose; starch polymers such as starch sodium glycolate, and starch sodium phosphate; and seaweed-based polymers such as sodium alginate, and propyleneglycol alginate; and synthetic hydrophobic polymers, for example, vinyl polymers such as polyvinyl alcohol, polyvinyl pyrrolidone, and polyvinyl methyl ether; acrylic resins such as non-crosslinked polyacrylamide, polyacrylic acid and alkali metal salts thereof, and water-soluble styrene-acrylic resin; water-soluble styrene-maleic acid resin; water-soluble vinylnaphthalene-acrylic resin; water-soluble vinylnaphthalene-maleic acid resin; polyvinyl pyrrolidone; polyvinyl alcohol; an alkali metal salt of a condensation product of formalin and β-naphthalene-sulfonic acid; a polymeric compound comprising a salt having a cationic functional group such as quaternary ammonium or amino group on the side chain thereof; and a natural polymeric compound such as shellac wax.

In addition to the above, the aqueous ink composition of the present invention may further comprise conventionally known additives such as an antiseptic agent, a mildewproofing agent, a pH adjustor, a chelate reagent, a corrosion inhibitor and a clogging preventing agent.

For instance, sodium dehydroacetate, sodium sorbate, sodium 2-pyridinethiol-1-oxide, sodium benzoate, and sodium pentachlorophenol can be employed as the antiseptic agents and mildewproofing agents.

Any materials that is capable of adjusting the obtained aqueous ink composition to pH7 or more without having no adverse effect on the ink composition can freely be employed as the pH adjustors in the present invention.

Examples of the pH adjustor for use in the present invention are amines such as diethanolamine and triethanolamine; hydroxides of alkali metals such as lithium hydroxide, sodium hydroxide and potassium hydroxide; other hydroxides such as ammonium hydroxide, quaternary ammonium hydroxide and quaternary phosphonium hydroxide; and carbonates of alkali metals such as lithium carbonate, sodium carbonate, and potassium carbonate.

Examples of the chelate reagent for use in the aqueous ink composition of the present invention include sodium ethylene diamine tetraacetate, sodium nitrilotriacetate, sodium hydroxyethyl ethylene diamine triacetate, sodium diethylene triamine pentaacetate, and sodium uramil diacetate.

Examples of the corrosion inhibitor are acid sulfite, sodium thiosulfate, ammon thiodiglycollic acid, diisopropyl ammonium nitrite, pentaerythritol tetranitrate, and dicyclohexyl ammonium nitrite.

Examples of the clogging preventing agent are urea and urea derivatives such as hydroxyethylurea.

Furthermore, the aqueous ink composition of the present invention may further comprise a water-soluble ultraviolet absorbing agent and a water-soluble infrared absorbing agent according to the application of the ink composition.

Other features of this invention will become apparent in the course of the following description of exemplary embodiments, which are given for illustration of the invention and are not intended to be limiting thereof.

EXAMPLE 1

A mixture of the following components was stirred and dissolved at 80° C.:

| | wt. % |
|---|---|
| Colorant: | 3 |
| Mixture of Compound (III-1) | |
| and Compound (III-2) | |
| 2-pyrrolidone | 2 |
| Diethylene glycol | 3 |
| Glycerin | 1 |

-continued

| | wt. % |
|---|---|
| Surfactant A: | 0.1 |
| Compound (I-1) | |
| Surfactant B: "Nonipol 400" | 0.5 |
| (Trademark), made by Sanyo | |
| Chemical Industries, Ltd. | |
| Ion-exchange water | Balance |

The above mixture was cooled to room temperature, and the pH of the mixture was adjusted to the range of 9 to 10 by the addition of 10% aqueous solution of lithium hydroxide. The thus obtained mixture was filtered through a Teflon filter of 0.22 μm, so that an aqueous ink composition No. 1 according to the present invention was obtained.

Using the Sensadyne 6000™ instrument to measure the surface tension by means of air bubble formation inside liquid solution, the surface tension (γ) of the above-prepared aqueous ink composition No. 1 was measured in the bubble frequency (ν) range of 0.5 to 7 Hz at 25° C.

Figure 1:
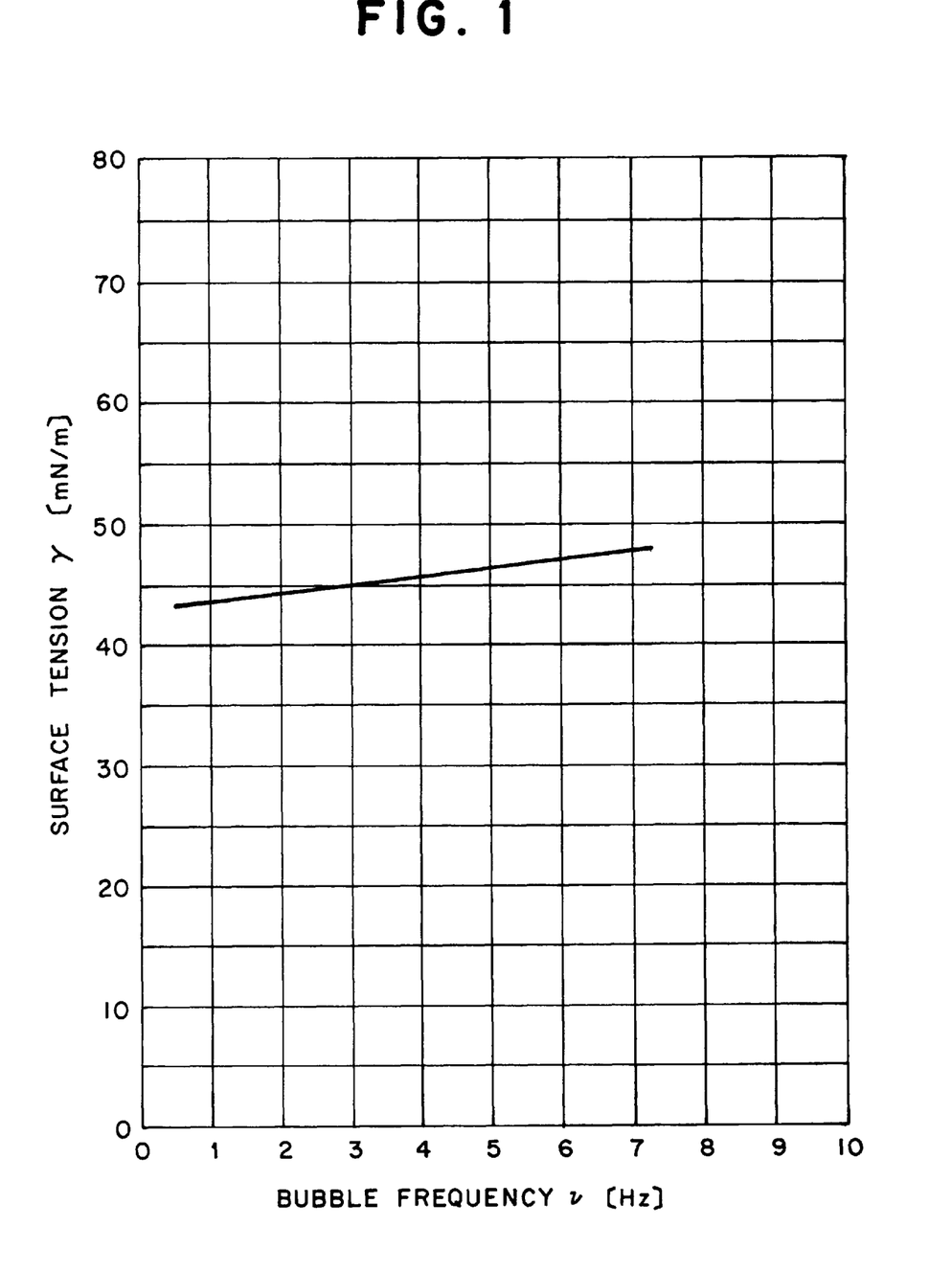
FIG. 1 is a graph which shows the relationship between the bubble frequency and the surface tension of an aqueous ink composition No. 1 obtained in Example 1.

FIG. 1 is a graph which shows the relationship between the surface tension (γ) and the bubble frequency (ν) of the aqueous ink composition No. 1.

As is apparent from the graph of FIG. 1, the following conditions were satisfied:

γ<50 mN/m when ν<1 Hz, and

γ>40 mN/m when ν>5 Hz.

EXAMPLE 2

The procedure for preparation of the aqueous ink composition No. 1 in Example 1 was repeated except that the formulation for the ink composition used in Example 1 was changed to the following formulation:

| | wt. % |
|---|---|
| Colorant: | 3 |
| Mixture of Compound (III-1) | |
| and Compound (III-2) | |
| 2-pyrrolidone | 4 |
| Diethylene glycol | 3 |
| Glycerin | 1 |
| Surfactant A: | 0.2 |
| Compound (I-1) | |
| Surfactant B: "Nonipol 400" | 1 |
| (Trademark), made by Sanyo | |
| Chemical Industries, Ltd. | |
| Sodium dihydroacetate | 0.2 |
| Ion-exchange water | Balance |

Thus, an aqueous ink composition No. 2 according to the present invention was obtained.

The surface tension (γ) of the above-prepared aqueous ink composition No. 2 was measured in the same manner as in Example 1.

As a result, the following conditions were satisfied:

γ<50 mN/m when ν<1 Hz, and

γ>40 mN/m when ν>5 Hz.

EXAMPLE 3

The procedure for preparation of the aqueous ink composition No. 1 in Example 1 was repeated except that the formulation for the ink composition used in Example 1 was changed to the following formulation:

| | wt. % |
|---|---|
| Colorant: | 2.5 |
| Compound (IV-1) | |
| Diethylene glycol | 6 |
| Glycerin | 2 |
| Surfactant A: | 0.5 |
| Compound (II-1) | |
| Surfactant B: "Nonipol 400" | 0.1 |
| (Trademark), made by Sanyo | |
| Chemical Industries, Ltd.) | |
| Sodium benzoate | 0.2 |
| Ion-exchange water | Balance |

Thus, an aqueous ink composition No. 3 according to the present invention was obtained.

The surface tension (γ) of the above-prepared aqueous ink composition No. 3 was measured in the same manner as in Example 1.

As a result, the following conditions were satisfied:

γ<50 mN/m when ν<1 Hz, and

γ>40 mN/m when ν>5 Hz.

EXAMPLE 4

The procedure for preparation of the aqueous ink composition No. 1 in Example 1 was repeated except that the formulation for the ink composition used in Example 1 was changed to the following formulation:

| | wt. % |
|---|---|
| Colorant: | 2.5 |
| Mixture of Compound (V-1) | |
| and Compound (V-2) | |
| 2-pyrrolidone | 6 |
| Diethylene glycol | 3 |
| Glycerin | 1 |
| Surfactant A: | 0.8 |
| Compound (II-1) | |
| Surfactant B: "Softanol 300" | 1 |
| (Trademark; made by Nippon | |
| Shokubai Co., Ltd. | |
| Sodium benzoate | 0.2 |
| Ion-exchange water | Balance |

Thus, an aqueous ink composition No. 4 according to the present invention was obtained.

The surface tension (γ) of the above-prepared aqueous ink composition No. 4 was measured in the same manner as in Example 1.

As a result, the following conditions were satisfied:

γ<50 mN/m when ν<1 Hz, and

γ>40 mN/m when ν>5 Hz.

EXAMPLE 5

The procedure for preparation of the aqueous ink composition No. 1 in Example 1 was repeated except that the formulation for the ink composition used in Example 1 was changed to the following formulation:

| | wt. % |
|---|---|
| Colorant: | 2.5 |
| Mixture of Compound (III-1) | |
| and Compound (III-2) | |
| 2-pyrrolidone | 4 |
| Diethylene glycol | 3 |
| Glycerin | 1 |
| Surfactant A: | 0.1 |
| Compound (I-1) | |
| Surfactant B: "Nonipol 400" | 2 |
| (Trademark), made by Sanyo | |
| Chemical Industries, Ltd. | |
| Sodium 2-pyridinethiol-1-oxide | 0.2 |
| Ion-exchange water | Balance |

Thus, an aqueous ink composition No. 5 according to the present invention was obtained.

The surface tension (γ) of the above-prepared aqueous ink composition No. 5 was measured in the same manner as in Example 1.

As a result, the following conditions were satisfied:

γ<50 mN/m when ν<1 Hz, and

γ>40 mN/m when ν>5 Hz.

COMPARATIVE EXAMPLE 1

The procedure for preparation of the aqueous ink composition No. 1 in Example 1 was repeated except that the Compound (I-1) serving as the surfactant A used in the formulation for the ink composition No. 1 in Example 1 was omitted therefrom.

Thus, a comparative aqueous ink composition No. 1 was obtained.

The surface tension (γ) of the above-prepared comparative aqueous ink composition No. 1 was measured in the same manner as in Example 1.

As a result, the previously mentioned conditions were not satisfied.

COMPARATIVE EXAMPLE 2

The procedure for preparation of the aqueous ink composition No. 3 in Example 3 was repeated except that the Compound (II-1) serving as the surfactant A used in the formulation for the ink composition No. 3 in Example 3 was replaced by a commercially available surfactant "BT7" (Trademark), made by Nikko Chemicals Co., Ltd.

Thus, a comparative aqueous ink composition No. 2 was obtained.

The surface tension (γ) of the above-prepared comparative aqueous ink composition No. 2 was measured in the same manner as in Example 1.

As a result, the previously mentioned conditions were not satisfied.

COMPARATIVE EXAMPLE 3

The procedure for preparation of the aqueous ink composition No. 4 in Example 4 was repeated except that a mixture of 2-pyrrolidone in an amount of 6 wt. %, diethylene glycol in an amount of 3 wt. % and glycerin in an amount of 1 wt. % used in the formulation for the ink composition No. 4 in Example 4 was replaced by diethylene glycol monobutyl ether in an amount of 10 wt. %.

Thus, a comparative aqueous ink composition No. 3 was obtained.

The surface tension (γ) of the above-prepared comparative aqueous ink composition No. 3 was measured in the same manner as in Example 1.

As a result, the previously mentioned conditions were not satisfied.

COMPARATIVE EXAMPLE 4

The procedure for preparation of the aqueous ink composition No. 5 in Example 5 was repeated except that the amount of the Compound (I-1) serving as the surfactant A used in the formulation for the ink composition No. 5 in Example 5 was changed from 0.1 wt % to 2 wt. %.

Thus, a comparative aqueous ink composition No. 4 was obtained.

The surface tension ($\gamma$) of the above-prepared comparative aqueous ink composition No. 4 was measured in the same manner as in Example 1.

As a result, the previously mentioned conditions were not satisfied.

Using each of the aqueous ink compositions No. 1 to No. 5 according to the present invention and comparative aqueous ink compositions No. 1 to No. 4, the following evaluation tests were conducted.

(1) Measurement of contact angle

Using a commercially available instrument "Kyowa Contact Anglemeter CA-D" (Trademark), made by Kyowa Interface Science Co., Ltd., the contact angle of each aqueous ink composition with respect to a sheet of plain paper "MY PAPER" (trademark), available from NBS Ricoh Co., Ltd., was measured immediately after the ink was dropped on the paper using a micro syringe. Further, the contact angle of each aqueous ink composition with respect to an acrylic resin material constituting the ink flow path was measured 30 seconds after dropping of ink. The measurement was made at 25° C. for both cases.

The results are shown in Table 1.

(2) Image quality

Each ink composition was separately filled into an ink-jet printer having a nozzle with a diameter of 32 μm and a density of 600 dpi. The nozzle was caused to eject the ink composition by the application of pressure thereto at a recording frequency of 12 kHz, utilizing the action of piezoelectric element of PZT of a laminated material.

In this test, printing was conducted on ten kinds of paper, including reclaimed paper, high quality paper and bond paper. By visual inspection from the viewpoints of image blurring, image density, and the density of a solid image, the image quality of the printed ink images was evaluated on the following scale:

○: good
Δ: slightly poor
x: very poor

The ink deposition amount was about 20 g/m² in the solid image portion.

The results are shown in Table 1.

(3) Reliability of ink-ejecting performance

The printing operation was continuously carried out without a cleaning sequence of purging, vacuuming and wiping. Then, the printing operation was stopped for 24 hours. When the printing operation was again started after intermission of 24 hours, it was examined whether the weight of an ink droplet ejected from the nozzle was changed or not, and the ejecting direction was deviated or not. The reliability of ink-ejecting performance was evaluated on the following scale:

○: good
Δ: slightly poor
x: very poor

The results are shown in Table 1.

TABLE 1

| | Contact Angle (°) vs. Plain Paper | Contact Angle (°) vs. Ink Flow Path | Image Quality | Reliability of Ink-Ejection |
|---|---|---|---|---|
| Ex. 1 | 45 | 35 | ○ | ○ |
| Ex. 2 | 45 | 35 | ○ | ○ |
| Ex. 3 | 55 | 45 | ○ | ○ |
| Ex. 4 | 50 | 40 | ○ | ○ |
| Ex. 5 | 45 | 35 | ○ | ○ |
| Comp. Ex. 1 | 70 | 60 | Δ | x |
| Comp. Ex. 2 | 25 | 17 | x | Δ |
| Comp. Ex. 3 | 30 | 30 | x | ○ |
| Comp. Ex. 4 | 30 | 35 | x | ○ |

In the present invention, the surface tension of the aqueous ink composition is controlled as mentioned above. Therefore, when the aqueous ink composition of the present invention is used for ink-jet printing, the initial ink-loading performance and bubble-discharging performance are excellent due to sufficient wettability of the ink flow path by the ink composition. In addition, when ink images are formed on plain paper using the aqueous ink composition according to the present invention by ink-jet printing method, high quality images can be obtained because of proper penetrating properties of the ink composition into plain paper and wettability of plain paper by the ink composition.

Japanese Patent Application No. 08-132733 filed Apr. 30, 1996, Japanese Patent Application No. 08-184053 filed Jun. 25, 1996, and Japanese Patent Application No. 08-305749 filed Oct. 31, 1996 are hereby incorporated by reference.

What is claimed is:

1. An aqueous ink composition comprising a colorant, a humectant, surfactant A having a surface tension $\gamma A$ (mN/m) of less than 50 mN/m when a 0.1 wt % aqueous solution of said surfactant A is measured by a maximum bubble pressure method at 25° C. and the bubble frequency $\nu A$ (Hz) is set at less than 1 Hz, and surfactant B having a surface tension $\gamma B$ (mN/m) of more than 40 mN/m when a 0.1 wt % aqueous solution of said surfactant B is measured by a maximum bubble pressure method at 25° C., and the bubble frequency $\nu B$ (Hz) is set at less than 1 Hz, wherein said aqueous ink composition has a surface tension $\gamma$ of less than 50 mN/m when measured by a maximum bubble pressure method at 25° C. with a bubble frequency $\nu$ of said aqueous ink composition being set at less than 1 Hz, and a surface tension $\gamma$ of more than 40 mN/m when measured by said maximum bubble pressure method at 25° C., with said bubble frequency $\nu$ of said aqueous ink composition being set at more than 5 Hz.

2. The aqueous ink composition as claimed in claim 1, wherein said surfactant A is selected from the group consisting of a polyoxyethylene alkyl ether acetate of formula (I):

$$R^1-O-(CH_2CH_2O)_m-CH_2COOM \quad (I)$$

wherein $R^1$ is an alkyl group having 6 to 14 carbon atoms, which may be branched; m is an integer of 3 to 12, and M is a cation selected from the group consisting of alkali metal ion, quaternary ammonium cation, quaternary phosphonium cation and alkanol amine cation; and a dialkyl sulfosuccinate of formula (II):

(II)

wherein $R^2$ is an alkyl group having 5 to 7 carbon atoms, which may be branched, and M is a cation selected from the group consisting of alkali metal ion, quaternary ammonium cation, quaternary phosphonium cation and alkanol amine cation.

3. The aqueous ink composition as claimed in claim 2, wherein said surfactant A is in an amount of 0.05 to 1.0 wt. % of the total weight of said aqueous ink composition.

4. The aqueous ink composition as claimed in claim 1, wherein said surfactant B is a nonionic surfactant.

5. The aqueous ink composition as claimed in claim 4, wherein said surfactant B is in an amount of 0.05 to 5.0 wt. % of the total weight of said aqueous ink composition.

* * * * *

UNITED STATES PATENT AND TRADEMARK OFFICE
CERTIFICATE OF CORRECTION

PATENT NO.    : 5,972,082
DATED         : October 26, 1999
INVENTOR(S)   : Masayuki Koyano et al.

Page 1 of 1

It is certified that error appears in the above-identified patent and that said Letters Patent is hereby corrected as shown below:

Column 4,
Line 41, delete "CHO" and insert -- $CH_3$ --.

Signed and Sealed this

Second Day of April, 2002

Attest:

JAMES E. ROGAN
Attesting Officer      Director of the United States Patent and Trademark Office